(12) United States Patent
Rauth et al.

(10) Patent No.: US 7,154,080 B1
(45) Date of Patent: Dec. 26, 2006

(54) SYSTEM AND METHOD FOR DETECTING THE EFFICACY OF MACHINED PARTS

(76) Inventors: Dick Rauth, 1550 N. County Line Rd., Geneva, OH (US) 44041; Nick Muha, 7540 Lake Shore Blvd., Mentor, OH (US) 44060; Mike Freeman, 5653 Walnut St., Mentor, OH (US) 44060

( * ) Notice: Subject to any disclaimer, the term of this patent is extended or adjusted under 35 U.S.C. 154(b) by 15 days.

(21) Appl. No.: 11/035,028

(22) Filed: Jan. 13, 2005

(51) Int. Cl.
*H01J 40/14* (2006.01)

(52) U.S. Cl. .................. 250/222.1; 356/237.6
(58) Field of Classification Search ............ 250/222.1; 356/237.1, 237.6; 219/121.83
See application file for complete search history.

(56) References Cited

U.S. PATENT DOCUMENTS

| | | | |
|---|---|---|---|
| 2,453,720 A | 11/1948 | Meister | 209/588 |
| 2,892,951 A | 6/1959 | Linderman | 250/372 |
| T862,010 I4 | 5/1969 | Heitz et al. | 250/559.42 |
| 3,529,169 A * | 9/1970 | Heaney | 250/223 B |
| 4,107,541 A | 8/1978 | Kirsch | 250/559.4 |
| RE29,891 E | 1/1979 | Phillips | 356/240.1 |
| 4,483,615 A | 11/1984 | Bieringer et al. | 356/239.1 |
| 4,532,723 A | 8/1985 | Kellie et al. | 356/73 |
| 4,608,480 A * | 8/1986 | Bizot et al. | 219/121.7 |
| 4,925,304 A | 5/1990 | Updike | 356/241.1 |
| 5,777,730 A * | 7/1998 | Dunlap | 356/237.1 |
| 6,130,405 A * | 10/2000 | Loringer | 219/121.71 |
| 6,963,396 B1 * | 11/2005 | Kimberlin | 356/237.6 |
| 2004/0223143 A1 * | 11/2004 | Yasuda et al. | 356/237.1 |

* cited by examiner

*Primary Examiner*—Thanh X. Luu
(74) *Attorney, Agent, or Firm*—Renner, Otto, Boisselle and Sklar, LLP (57) ABSTRACT

The present invention relates to a system and method for detecting the efficacy of machined parts, and particularly to an automated system and method that detects whether tooling features (e.g., holes) are properly formed and aligned in work pieces during the machine tooling process. In one embodiment the system and method includes at least one roller that engages an associated work piece and is capable of applying a rotational force to the work piece, a source of electromagnetic radiation emits electromagnetic radiation through at least one feature of the associated work piece, and a detector for detecting a characteristic associated electromagnetic radiation with the at least one feature of the electromagnetic radiation when the rotational force is applied. The detected characteristic of the electromagnetic radiation is used to determine whether the work piece has been properly tooled (or machined) or contains a defect.

32 Claims, 9 Drawing Sheets

SYSTEM AND METHOD FOR DETECTING THE EFFICACY OF MACHINED PARTS

BACKGROUND OF THE INVENTION

1. Technical Field

The present invention relates to systems and methods for detecting the efficacy of machined parts (or work pieces), and particularly to automated systems and methods that detect whether tooling features (e.g., drilled holes, tapped holes, slots, etc.) are properly formed and aligned in work pieces during the machine tooling process.

2. Description of the Related Art

Manufacturers are placing an ever increasing burden on suppliers to produce high quality, defect-free parts. At the same time, manufacturers are forcing suppliers to provide these parts at low costs. Accordingly, suppliers are constantly forced to increase manufacturing efficiencies in order to remain competitive against other suppliers.

This reality is particularly pervasive in the automotive industry, which recently implemented a number of "just-in-time" and "sequenced parts delivery" initiatives. These initiatives essentially require suppliers to deliver manufactured parts just-in-time for the parts to be used by the manufacturer and in the proper sequence set forth by the manufacturer. The goal of these initiatives is to maximize the manufacturer's use of floor space, reduce inventory levels and manufacturing costs and decrease the time consumer's wait for vehicles. A result of the initiatives is to place the burden on suppliers to produce defect free parts on-demand.

When manufacturing customers receive defective parts there can be severe consequences for both the manufacturer and the parts supplier. Defective parts make assembly lines less efficient. For example, an assembly line worker may partially install a part and determine that the part is defective (e.g., the part contains misaligned or improperly formed holes). The assembly line worker must then remove the defective part and install a non-defective part. This lost efficiency may lead to a significant loss of time and money to the manufacturer. In a worst case scenario, defective parts may even cause a complete shutdown of an assembly line. This is particularly true with the implementation of the "just-in-time" and "sequenced parts delivery" initiatives, where the manufacturer does not maintain a vast inventory of replacement parts.

Providing defective parts to manufacturers may also have severe consequences for suppliers. These consequences range from loss of a contract to a particular manufacturer to increased production costs. For example, a typical machined part undergoes a number of machining steps. If a defect (e.g., a defective or misaligned hole in a work piece or a broken drill bit lodged in a work piece) is formed in an early stage in the machine tool process and goes undetected, each additional value-added operation performed on the defective part results in wasted labor and machining costs. These costs may be multiplied if multiple defective parts are produced at an early stage in the machine tool process. Thus, it is beneficial for the supplier to detect any defects early in the machine tool process.

The most common method for suppliers to inspect manufactured parts or work pieces for defects during the various steps in the machine tool process is by the use human quality assurance inspectors. But due to the intricate detail of the typical machined part or work piece and the propensity for human inspectors to tire over time, it is likely that a defective part may be overlooked and inadvertently sent to a manufacturer. For this reason, it is also common for suppliers to have multiple inspection sites and/or personnel, which may limit the number of defective parts or work pieces shipped to a manufacturer. However, multiple levels of quality assurance inspectors significantly increase manufacturing costs.

Accordingly, there exists a need in the art for automated and improved systems and methods for detecting the efficacy of machined parts during the machine tooling process.

SUMMARY OF THE INVENTION

The present invention relates to a system and method for detecting the efficacy of machined parts using electromagnetic radiation. In one aspect of the invention, the invention relates to a method for detecting the efficacy of features formed in a work piece, the method including: loading an associated work piece into a test position, wherein the associated work piece includes at least one feature that exhibits at least one measurable characteristic upon application of a rotational force to the work piece; exposing the at least one feature of the work piece to electromagnetic radiation from an electromagnetic radiation source; applying a rotational force to the work piece; and detecting the at least one measurable characteristic associated with the at least one feature of the associated work piece.

In another embodiment, the present invention relates to a system for detecting the efficacy of features formed in a work piece, the system including: at least one roller that engages an associated work piece and is capable of applying a rotational force to the work piece, wherein the associated work piece includes at least one feature that exhibits at least one measurable characteristic upon application of the rotational force; a source of electromagnetic radiation that emits electromagnetic radiation through the at least one feature of the associated work piece; and a detector for detecting a characteristic associated with the at least one feature of the electromagnetic radiation when the rotational force is applied.

In another embodiment, the present invention relates to a method for detecting the efficacy of features formed in a work piece, the method including: loading an associated work piece into a test position, wherein the associated work piece includes at least one feature that exhibits a frequency rate upon application of a rotational force to the work piece; exposing the at least one feature of the work piece to electromagnetic radiation from an electromagnetic radiation source; applying a rotational force to the work piece; and detecting the frequency rate associated with the at least one feature of the associated work piece.

In another embodiment, the present invention relates to a method for detecting the efficacy of features formed in a work piece, the method including: loading an associated work piece into a test position, wherein the associated work piece includes a first and a second feature that exhibit at least measurable characteristic upon application of a rotational force to the work piece; exposing the first feature of the work piece to electromagnetic radiation emitted from a first electromagnetic radiation source, wherein the first electromagnetic radiation source is centrally loaded within at least a portion of the work piece; exposing the second feature of the work piece to electromagnetic radiation from a second electromagnetic radiation source; applying a rotational force to the work piece; detecting the at least one measurable characteristic associated with the first feature by direct detection of the electromagnetic radiation through the first feature; and detecting the at least one measurable characteristic associated with the second feature by reflecting the electromagnetic radiation off of the second feature of the associated work piece.

In another embodiment, the present invention relates to a method for detecting the efficacy of features formed in a work piece, the method including: loading an associated work piece into a test position, wherein the associated work piece includes a first and a second feature that exhibit measurable characteristics upon application of a rotational force to the work piece; exposing the first feature of the work piece to electromagnetic radiation emitted from a first electromagnetic radiation source, wherein the first electromagnetic radiation source is centrally loaded within at least a portion of the work piece; exposing the second feature of the work piece to electromagnetic radiation from a second electromagnetic radiation source, wherein the second electromagnetic radiation source is emitted in a substantially perpendicular relationship to the electromagnetic radiation emitted from the first electromagnetic radiation source; applying a rotational force to the work piece; and detecting the measurable characteristics associated with the at least first and second feature of the associated work piece.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

The present invention relates to systems and methods for detecting the efficacy of machined parts or work pieces, and particularly to an automated system and method that detects whether tooling features (e.g., drilled holes, tapped holes, slots, etc.) are properly formed and aligned in work pieces during the machine tooling process. In one embodiment, the system and method includes at least one roller that engages an associated work piece and is capable of applying a rotational force to the work piece, a source of electromagnetic radiation that emits electromagnetic radiation through at least one feature of the associated work piece, and at least one detector for detecting a characteristic associated with the electromagnetic radiation emitted through the at least one feature of the associated work piece when the rotational force is applied. The detected characteristic of the electromagnetic radiation is used to determine whether the work piece has been properly machined or contains a defect.

In another embodiment, a second source of electromagnetic radiation emits electromagnetic radiation incident on at least one feature of the associated work piece, and a second detector for detecting a characteristic associated with the electromagnetic radiation reflected from the at least one feature when the rotational force is applied. The detected characteristic of the reflected electromagnetic radiation is used to determine whether the machined part or work piece has been properly machined or contains a defect.

Figure 1:
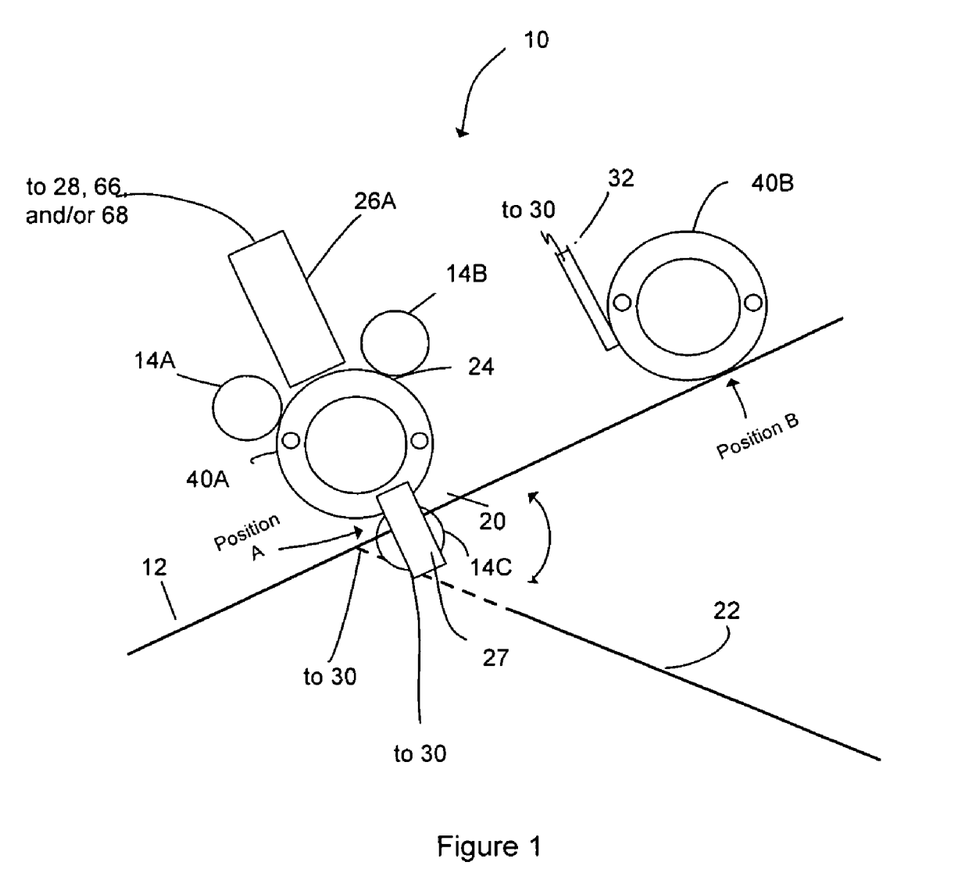
FIG. 1 is an exemplary system in accordance with one aspect of the invention.

An exemplary testing station 10 is shown in FIG. 1. The testing station 10 includes: a guide 12, rollers 14A–14C, a drive mechanism 16 (not shown) for imparting a rotational force on the rollers 14A–14C, a loading mechanism 18 (not shown), an escapement 20, a rejection shoot 22, at least one electromagnetic radiation source 24, at least one electromagnetic detector 26A, optionally at least one electromagnetic radiation source/detector 27, at least one display 28, a programmable logic controller (PLC) 30 (not shown), a loading retainer 32, and a central processing unit 34 (not shown) loaded with applicable software 36 (not shown) to perform the functionality described herein. FIG. 1 also depicts work pieces 40A and 40B at various points in the testing station 10 (e.g., work piece 40A is positioned in the test position (identified by "Position A", and work piece 40B is the next work piece to be tested (identified by "Position B").

The guide 12 is a metallic fixture capable of supporting one or more work pieces 40A–40B. The guide is preferably made of a metal alloy or hardened metal. The guide 12 is positioned at a slight angle to facilitate loading of the work pieces 40A and 40B to the testing station 10 through the use of gravity. As discussed below, the loading retainer 32 is communicatively coupled to the testing station 10 and controlled through software 36 and PLC 30 in order to raise and lower the loading retainer 32, which permits automatic loading of the work piece 40 into the test position (Position A) on testing station 10.

Figure 2:
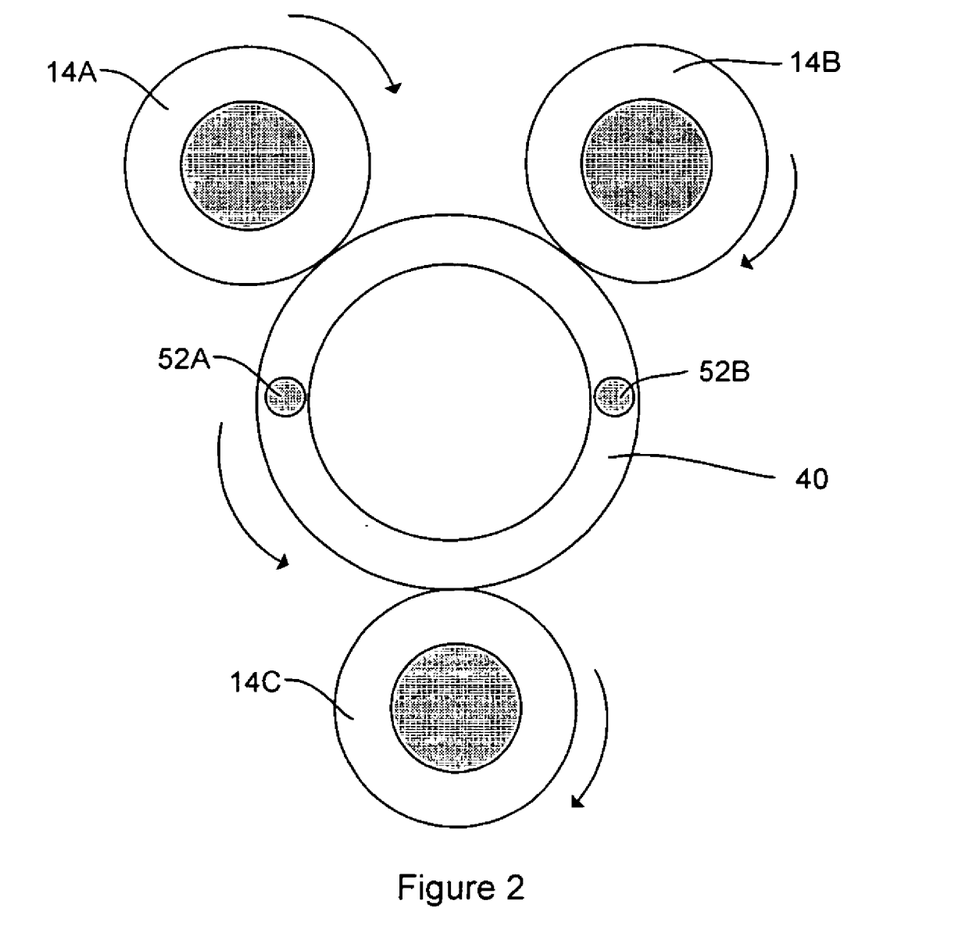
FIG. 2 is a detailed cross-sectional view of rollers engaging an associated work piece to induce rotation of the work piece in accordance with aspect of the present invention.

Upon loading, the load mechanism 18 engages the work piece to be tested and exerts an upward force to the work piece. A cradle is used to load the work piece into the test position. The work piece 40 becomes engaged to the stationary rollers 14A, 14B, and movable roller 14C, as shown in FIG. 2. A drive mechanism 16 (not shown) (e.g., chain and sprocket connected to a motor to impart a rotational force) may be connected to any or all of the rollers 14A–14C to impart a rotational force on the work piece 40. Preferably, the drive mechanism is connected to roller 14C. When the roller 14C engages the work piece 40 and secures the work piece 40 against the stationary rollers 14A–14B, a rotational force may be imparted to the rollers 14A–14C and the work piece 40. One of ordinary skill will readily appreciate that there are a variety of methods to load the work piece into the testing position (Position A). All such methods are deemed to fall within the scope of the invention, unless otherwise claimed.

When the work piece 40 is loaded onto the rollers 14A–14C, the work piece 40 quickly reaches the rotational speed of the rollers 14A–14C. In one embodiment, the rollers are controlled to rotate at a frequency of 10–100 Hz, preferably in the range of 40–50 Hz. One of ordinary skill in the art will readily appreciate that any frequency of rotation may be used so long as the detector(s) 26 is capable of properly functioning at the selected frequency range. In one aspect of the invention, the imparted rotational force is constant. In another aspect of the invention, the rotational force is predetermined. In another aspect of the invention, the rotational force may be time varying. In yet another embodiment of the invention, the rotational force may be controlled by a user or automatically by software to change the frequency of rotation in real time.

Figure 3A:
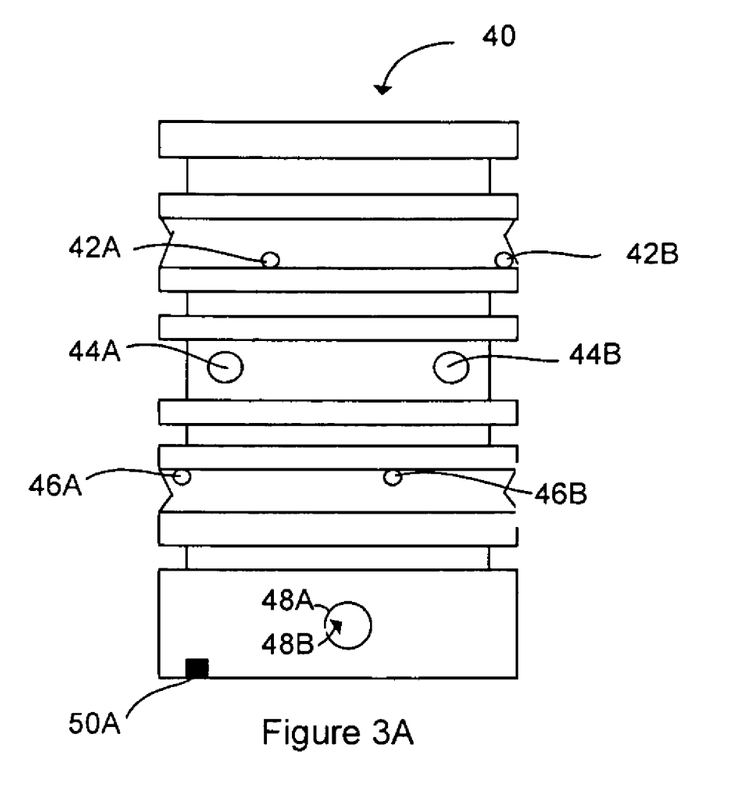
FIG. 3 is an exemplary work piece that may be used in accordance with one aspect of the present invention.
Figure 3B:
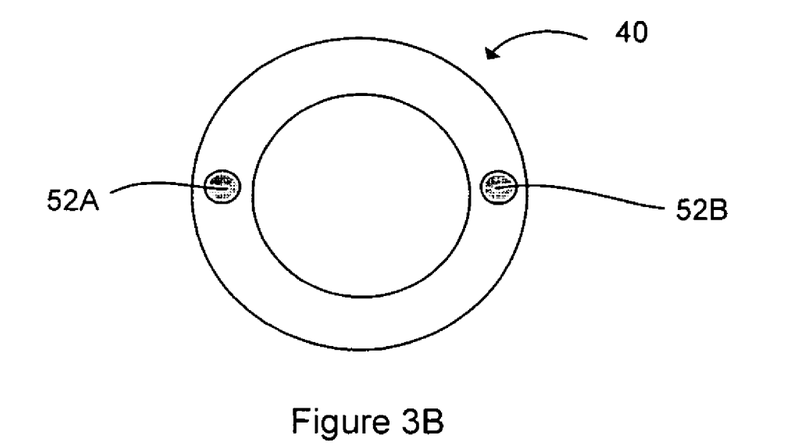

An exemplary work piece 40 is shown in FIGS. 3A and 3B. The work piece 40 may include one or more features machined in the work piece 40. For example, the work piece 40 may include drilled holes 42A–B, 44A–B, 46A–B, and 48A–48B. Drilled hole 48B is located approximately 180 degrees opposite and on the same general line as drilled hole 48A. In addition, the work piece 40 may include machined slots 50A–50B. Slot 50B is not shown in FIG. 3A, but is located approximately 180 degrees opposite and on the same general lines as slot 50B). The work piece 40 may further include tapped holes 52A–52B, as shown in FIG. 2B.

A drilled hole and a tapped hole require different techniques to measure the physical properties of the hole. As described in this specification, a drilled hole is generally capable of emitting radiation through the feature directly to one or more detectors used to determine the efficacy of the drilled hole. Tapped holes, on the other hand, may generally be inspected by using principles of reflectance to determine the efficacy of the tapped holes. One of ordinary skill in the art will readily appreciate that the invention is not limited to the exemplary work piece 40 illustrated in the Figures. The invention is applicable to any work piece taking any variety of forms (including cylindrical, rectangular, elliptical, etc.) and containing any variety of machined features (including drill holes, tapped holes, slots, through holes, etc.).

The machined features (e.g., drilled holes, tapped holes, slots, etc.) may be oriented in the same direction (i.e., normal to the surface) or in various directions. For example, drilled holes 42A–B may be machined at a first angle that is anti-normal to the cylindrical surface of the work piece 40 and drilled holes 44A–B may be machined to be configured normal to the surface of the work piece 40. One of ordinary skill in the art will readily appreciate that the invention is amenable to inspecting a wide variety of features, configurations, and alignments associated with a particular work piece.

Figure 4A:
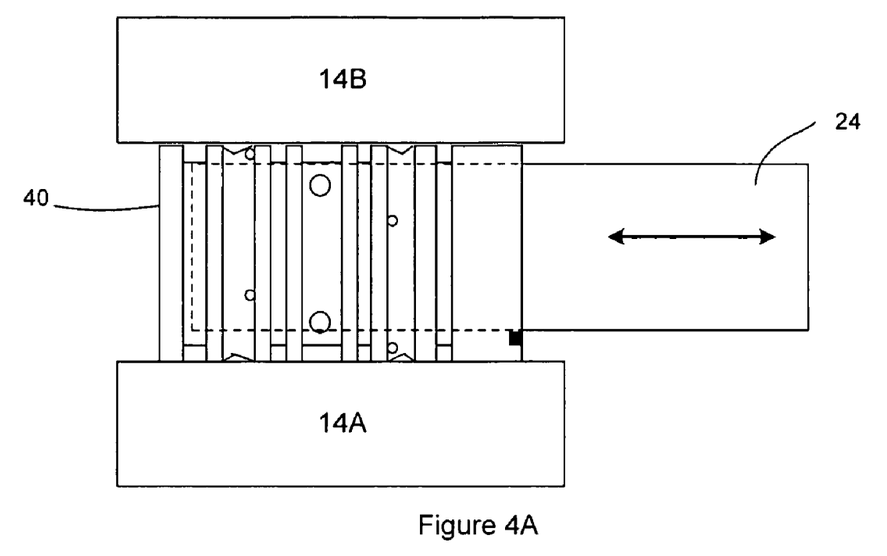
FIG. 4A is a top cross-sectional view of an electromagnetic radiation source being inserted into the central portion of an associated work piece in accordance with one aspect of the present invention.
Figure 4B:
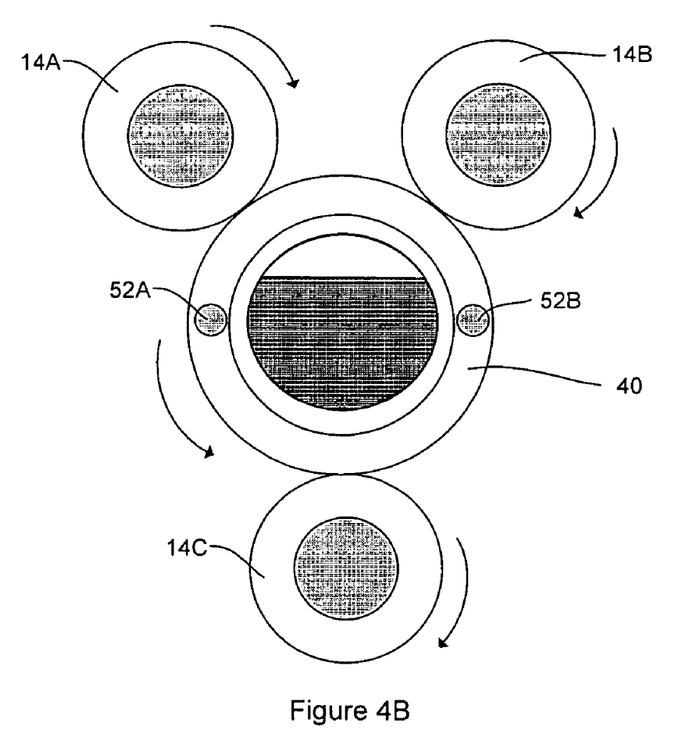
FIG. 4B is side cross-sectional view of FIG. 4A.

As shown in FIG. 4, upon loading the work piece 40 into the testing station 10, an electromagnetic radiation source 24 may be inserted centrally into the work piece 40 so that electromagnetic radiation may exit the work piece 40 through one or more of the machined features 42, 44, 46, 48, 50, and 52. The electromagnetic radiation source 24 may take any form. For example, the electromagnetic radiation source 24 may be one or more light emitting diodes, a laser, or light bulbs that are capable of emitting light energy in any form including, for example, visible, infrared, radar, gamma, x-rays, etc. Preferably, the electromagnetic radiation source 24 is a high intensity light that is emitted through a Lexan rod that may be centrally loaded through the work piece 40.

One such electromagnetic radiation source is manufactured by Tri-Tronics and is Model No. HSLS-12. In order to reduce light scattering effects throughout the entire central portion of the work piece 40, it is preferable for the radiation to be emitted in a directed fashion through only a portion of the Lexan rod, as opposed to the entire 360 degree field. As shown in FIG. 4, only the upper portion of the electromagnetic radiation source 24 emits electromagnetic radiation. The lower portion, indicated by the dark region, does not emit sufficient light to interfere with the detection (or inspection) process.

The testing station 10 includes at least one detector 26. Any detector capable of detecting at least one characteristic of the electromagnetic radiation emitted from the electromagnetic radiation source 24 may be used. Generally, a detector 26 is capable of detecting the presence or absence of a threshold amount of electromagnetic radiation through at least one machined feature. In one embodiment, the detector 26 is capable of determining the amount of electromagnetic radiation received and/or the intensity of the received electromagnetic radiation. Upon detecting the presence (or absence) of a machined feature, a count for the detector may be incremented. The associated count may be converted to a rate or a frequency, which is determined, at least in part, by the frequency of rotation of the work piece 40 and the number of features detected by a particular detector 26 for a particular time interval.

Due to the small diameter of many of the machined features (e.g., holes) that may be formed on the work piece 40, detectors 26 are generally aligned in parallel (or normal) with the machined feature that is being inspected. For example, if the machined feature is oriented at a particular angle (e.g., 25 degrees) from the surface of the work piece 40, the detector 26 may be aligned perpendicular to the machined feature (e.g., aligned at an angle of 25 degrees with respect to the surface of the work piece 40). Such an alignment generally provides for the maximum amount of electromagnetic radiation transmitted through the machined feature or reflected by the machined feature to be detected by the detector, as discussed below.

In addition to detector 26, another type of electromagnetic radiation source/detector 27 may be used in accordance with the invention. The electromagnetic radiation source/detector 27 is a combined electromagnetic source 27A and electromagnetic detector 27B (also referred to herein as an integral device), as shown in FIG. 5B. Preferably, the electromagnetic radiation source/detector 27 is a Model No. HSLS-12, which is marketed under the SMARTEYE trademark and manufactured by Tri-Tronics of Tampa, Fla. The electromagnetic radiation source/detector 27 is particularly suited for supplying and measuring reflected electromagnetic radiation that may be useful in inspecting holes that are not through holes (e.g., tapped holes).

One of ordinary skill in the art will readily appreciate that any type of detector that is capable of detecting the presence or absence of a threshold amount of electromagnetic radiation through or reflected by a machined feature is within the scope of the present invention.

Figure 5A:
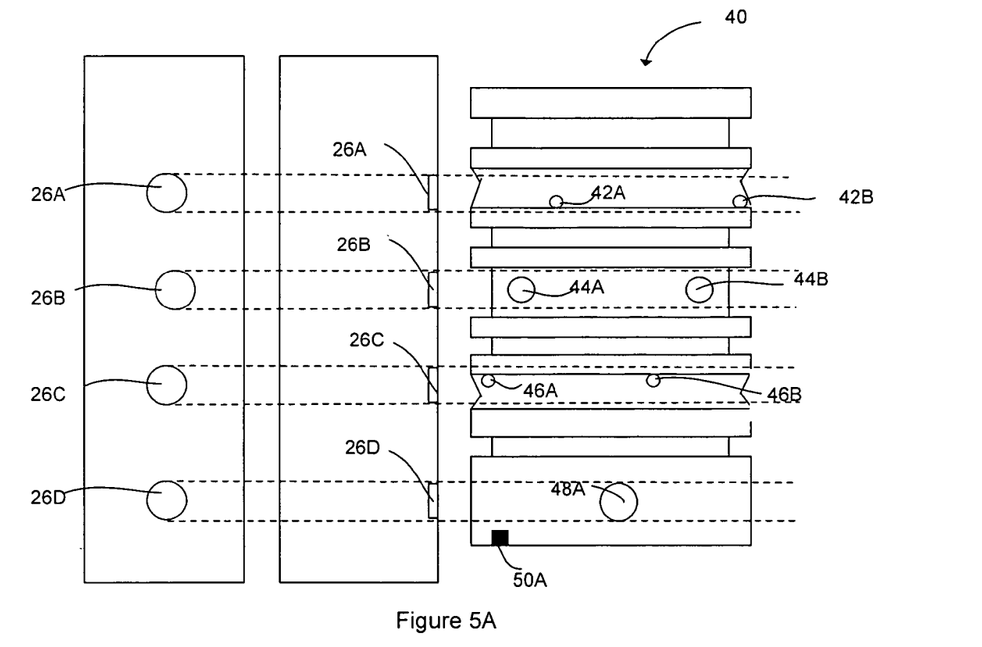
FIGS. 5A and 5B are cross-sectional views illustrating the alignment of detectors with respect to machined features in accordance with one aspect of the present invention.
Figure 5B:
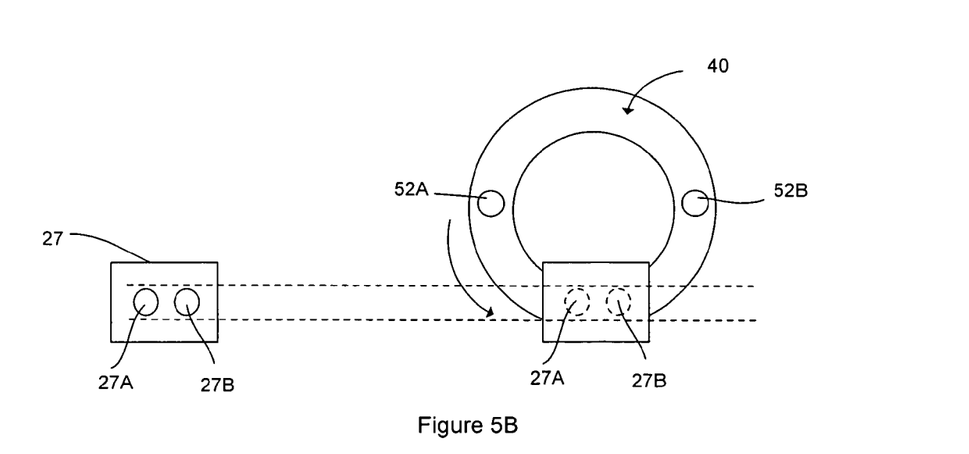

FIG. 5A shows multiple detectors 26A–26D and work piece 40. The far left depiction of the detectors 26A–26D is a head-on view of the detectors 26A–26D. The remaining two depictions, illustrate the relationship of the detectors 26A–26D during the testing process. Likewise, in FIG. 5B, the far left depiction is a head-on view of the combined electromagnetic radiation source/detector 27. The remaining two depictions, illustrate the relationship of the electromagnetic radiation source/detector 27 during the testing process.

As shown in FIGS. 5A–5B, multiple detectors 26A–26D and 27 may be used to detect the efficacy of various machined features in the work piece 40. As shown in FIG. 5A, detectors 26A–26D may be positioned along surface of the work piece 40 in order to detect electromagnetic radiation emitted through the various machined features 42A–B, 44A–B, 46A–B, and 48A–B. The detectors 26A–26D detect the presence of electromagnetic radiation emitted through the various machined features 42A–B, 44A–B, 46A–B, and 48A–B. This type of detection is also referred to herein as "direct detection".

As discussed below, if the frequency (or rate) varies from an expected frequency (or rate), the work piece 40 is considered defective and appropriate actions may be taken to prevent the defective work piece 40 from being provided to a manufacturer. By detecting the presence of electromagnetic radiation, the detectors 26A–26D are generally able to determine whether a particular feature has been properly formed (e.g., the feature is completely formed in the proper orientation and configuration). As shown, the detectors 26A–26D are generally stationary, however, it is within the scope of the present invention that the detectors may rotate around the circumference of the work piece 40.

In addition to detectors (e.g., 26A–26D) placed along the surface of the work piece 40, additional detector(s), similar to those discussed above for detectors 26A–26 or electromagnetic radiation source/detector 27 may also be placed at or near the ends of the work piece 40 in order to detect the efficacy of machined features formed on the ends of the work piece 40. As shown in FIG. 5B, the electromagnetic radiation source/detector 27 includes a light source 27A and a receiver 27B for detecting light reflected from the end of the work piece 40. The electromagnetic radiation source/detector 27 detects the absence of reflected light in order for a feature to register as a count. For example, while the work piece 40 is rotating, the electromagnetic radiation source/detector 27 is inspecting the flat end of the work piece 40, electromagnetic radiation emitted from electromagnetic source 27A and is reflected from the end surface of the work piece and detected by the detector 27B. When a machined feature is detected, the electromagnetic radiation is substantially diffused and does not totally reflect back to the detector, as in the case where there is no machined feature. Thus, the electromagnetic radiation source/detector 27 detects the absence of reflected electromagnetic radiation in determining the frequency or rate associated with the machined feature on the work piece 40.

One of ordinary skill in the art will readily appreciate that any detector or combination of detectors that are capable of detecting the efficacy of the machined parts is deemed to fall within the scope of this invention. A detector is generally selected based upon the machined feature or formation to be tested. For a variety of machined features, either electromagnetic detector 26 or electromagnetic radiation source/detector 27 may be used interchangeably to detect the efficacy of the machined part. For example, machined slot 50A–50B may be inspected by emitting radiation through the slot and detecting the emitted light. Alternatively, the machined slots 50A–50B may be inspected by reflecting electromagnetic radiation off the end of the work piece 40 and detecting the absence of reflected electromagnetic radiation. In either case, the results can be converted to a frequency or rate to determine if a particular work piece is defective.

Figure 6:
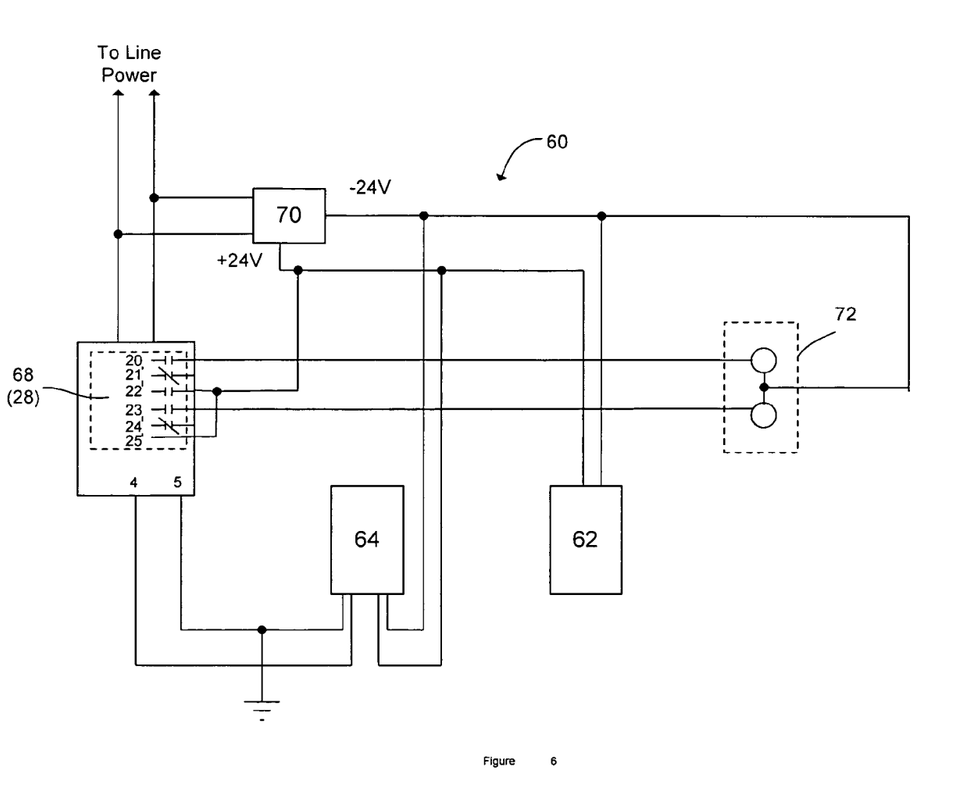
FIG. 6 is a circuit diagram in accordance with one aspect of the present invention.

An exemplary hardware circuit diagram of the invention is illustrated in FIG. 6. As illustrated, the system 60 includes an electromagnetic radiation source 62, at least one detector 64, at least one display 66 with at least one associated control element 68, a power supply 70 and a fault indication element 72. From a standard line voltage of 120V, the power supply 70 steps down the voltage to ±24V. The +24V is used to supply power to the electromagnetic radiation source 62, at least one detector 64, at least one display 66 with at least one associated control element 68. The −24V terminal is connected to the fault indication element 72 and the at least one detector 64.

The electromagnetic radiation source 62 and the at least one detector 64 have been previously discussed above in relation to the electromagnetic radiation source 24 and the electromagnetic radiation detector 26 and/or the electromagnetic radiation source/detector 27. Generally, each detector 64, has a separate display 66 with an associated control element 68 associated therewith. For instance, if a system employs five detectors, there will generally be five separate displays 66A–66E and five associated control elements 68A–68E. The display 66 may be programmed to display any information of interest to the user of the system (e.g., rate, frequency, feature counts, etc.). Preferably, the display 64 is Model PAXI-1/8 DIN Counter/Rate Panel Meter manufactured by Red Lion. The display 64 has a variety of useful features including an associated control element 66 that allows users to independently scale each input signal to various process values and generate outputs that can be independently configured to suit a variety of control and alarm requirements.

The control element 66 may be configured to determine if the number of detected machined features falls within a predetermined range. Generally, the predetermined range is selected by testing a known defect free work piece 40. The control element 68 is configured to provide a window (or range of values) of acceptable values that correlate to a defect free work piece. This process is repeated for each of the control elements in a particular system. For example, if a system is monitoring five machined features, each control element 68A–68E is configured to provide a window (or range of values) of acceptable values to correlate to a defect free work piece for each portion under test. In this way, each portion of the work piece 40 may have a different rate or frequency associated with the machined features for a portion of the work piece 40. For example, if one location has four machined features along the circumference of the work piece and another location only has two machined features along the circumference, the rate for the first location will be twice that of the rate for the other location. Thus, the control elements provide the user with flexibility to inspect a wide variety of machined features on a particular work piece.

Figure 8:
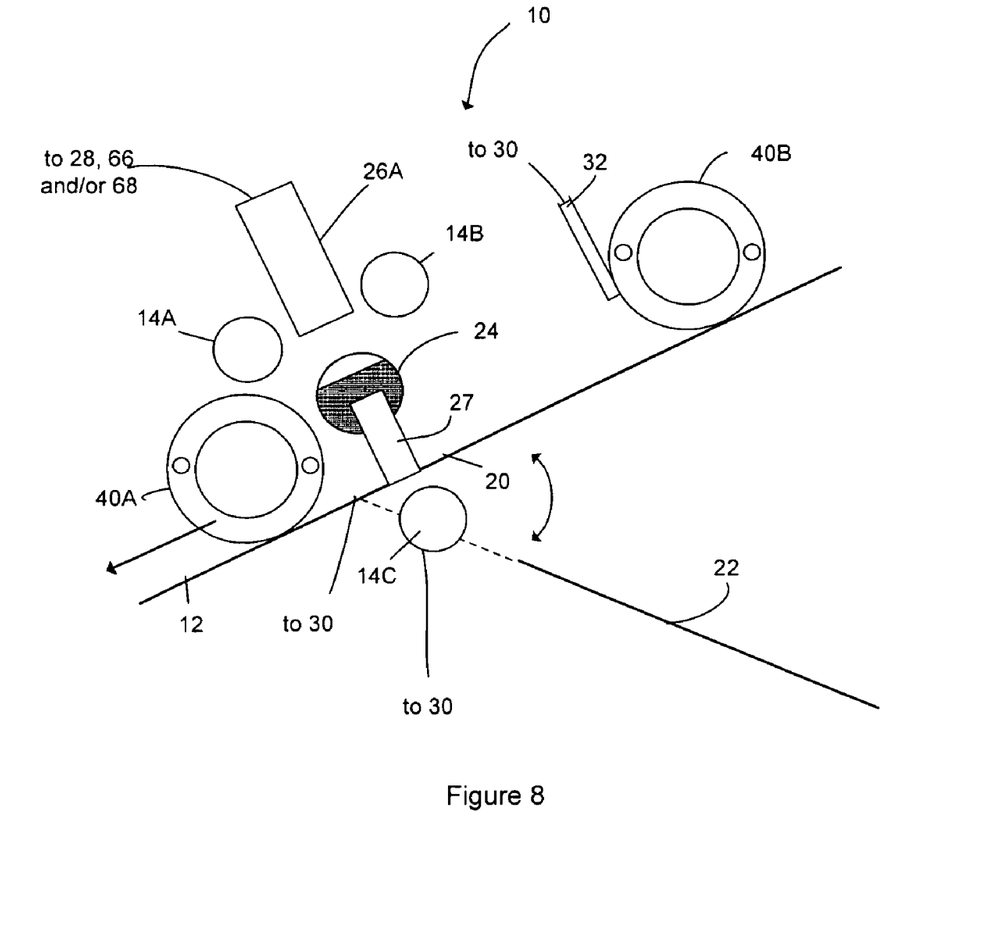
FIG. 8 is an exemplary system illustrating a work piece that was determined to be defect free in accordance with one aspect of the present invention.
Figure 9:
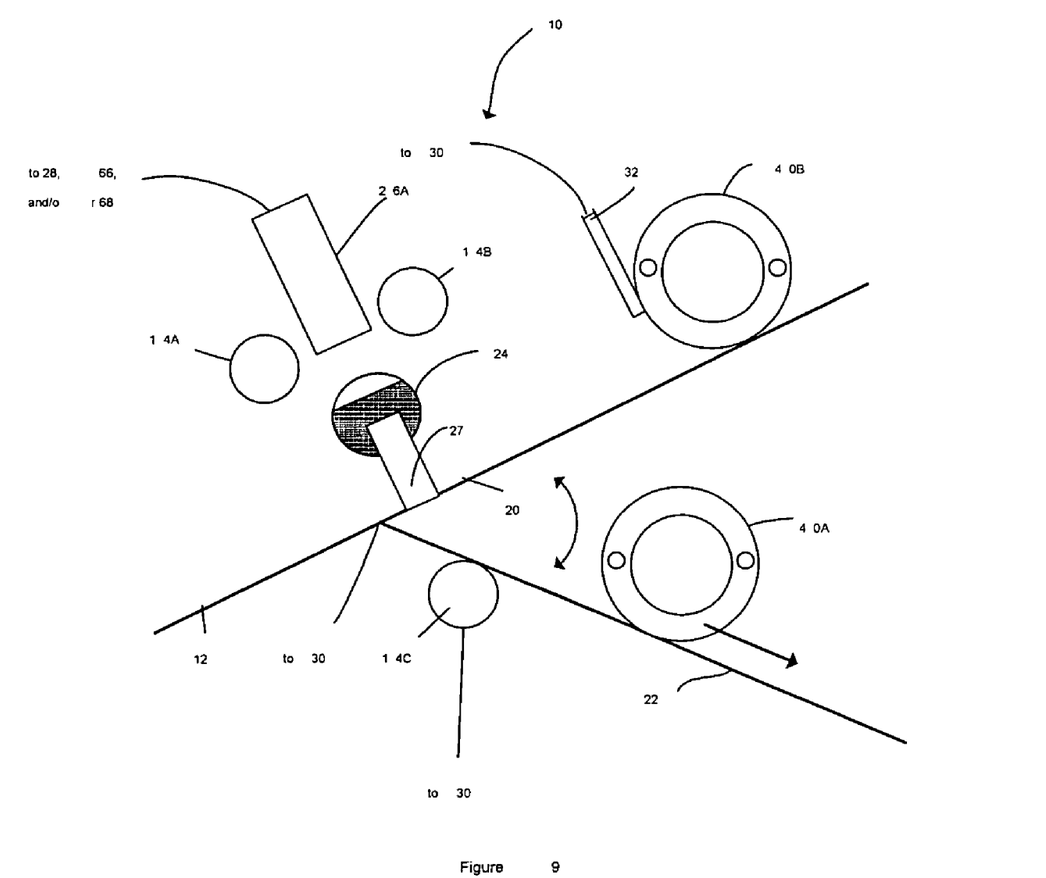
FIG. 9 is an exemplary system illustrating a work piece that was determined to contain a defect in accordance with one aspect of the present invention.

Once the work piece 40 is rotated at the desired frequency, the detectors communicate the detected frequency of the machined features to the central processing unit 34 and the application software 36. If the machined features fall within the predetermined window (or range) for all of the detectors, the work piece is determined to be defect free and the work piece is disengaged from the rollers and other inspection equipment (e.g., the electromagnetic radiation source 24) and continues to the next point in process (e.g., shipping or another machine tool process), as shown in FIG. 8, and another work piece may be loaded into the test position as discussed above.

If the predetermined (or expected) values falls outside the window (or range) of acceptable values for at least one of the detectors, the work piece is determined to be defective. The application software 36 transmits a control signal to the programmable logic controller 30 and the escapement 20 changes positions (from Position A (the normal position) to Position B, as shown in FIG. 8). Once a work piece has been determined to be defective, a number of operations may be taken with the work piece. For example, the defective work piece may be sent to a rejection bin or another inspection site for inspection by a human inspector, etc. Once the defective work piece is removed from the testing position, another control signal is communicated to the programmable logic controller 30 and the escapement 20 is raised to Position A and another work piece may be loaded into the test position as discussed above.

Figure 7:
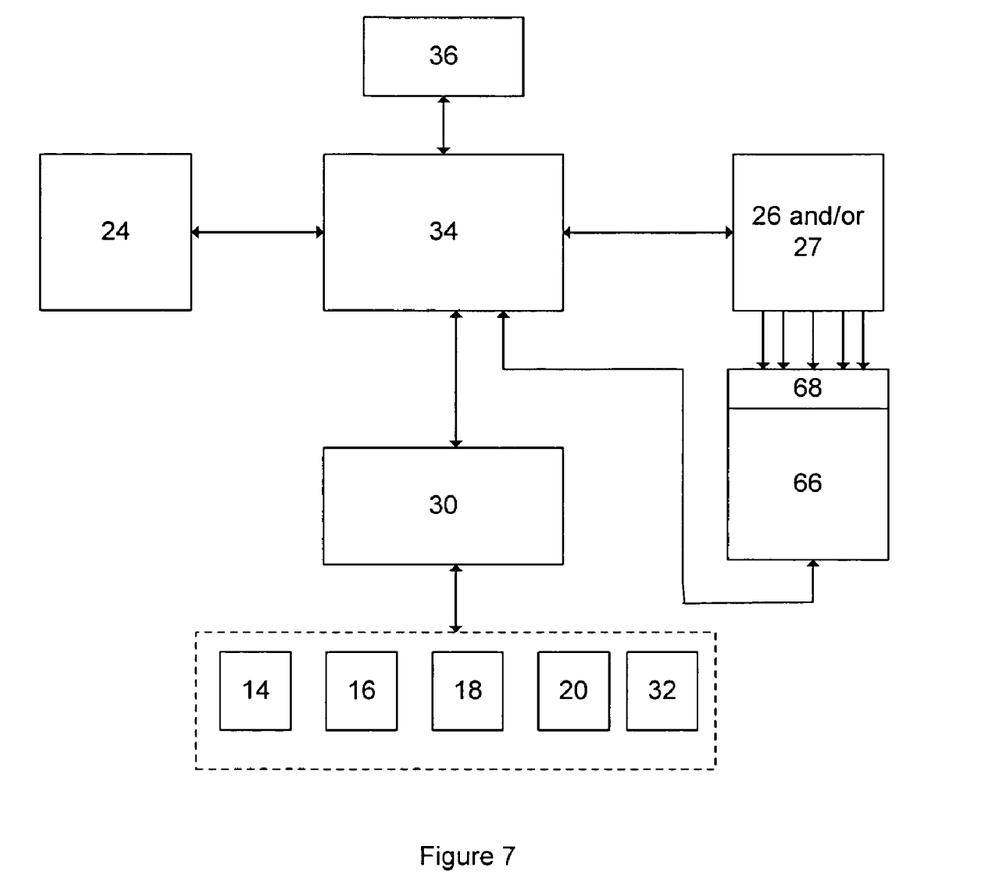
FIG. 7 is a block diagram illustrating an exemplary control and communication structure in accordance with one aspect of the present invention.

As shown in FIG. 7, the application software 36 may be used to monitor and control various components of the system 10. For example, the application software is capable of monitoring and controlling the rollers 14A–14C, the drive mechanism 16, the loading mechanism 18, the escapement 20, and the loading retainer 32 through the CPU 34 and the programmable logic controller 30. In addition, control signals for electromagnetic radiation source 24, the electromagnetic detector 26, and the combined electromagnetic radiation source/detector 27 may also be controlled and monitored by the application software 36. The display 66 and control units 68 are capable of receiving information from the detectors 26, 27 and transmitting the information to the application software 36. The application software 36, in turn, may send a control signal to any component of the system in accordance with the operating conditions detected.

Although the invention has been shown and described with respect to a certain preferred embodiment or embodiments, it is obvious that equivalent alterations and modifications will occur to others skilled in the art upon the reading and understanding of this specification and the annexed drawings. In particular, with regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments as may be desired and advantageous for any given or particular application.

Likewise, while the invention has been described, in part, as a series of steps (or processes), the precise order of the steps (or processes) may be performed in various sequences. For example, a rotational force may be applied to the work piece before the electromagnetic radiation source is inserted into a central cavity of the work piece. Alternatively, the electromagnetic radiation source may be inserted into a central cavity of the work piece and then a rotational may applied to the work piece.

What is claimed is:

1. A method for detecting the efficacy of features formed in a work piece, the method comprising:
    loading an associated work piece into a test position, wherein the associated work piece includes at least one feature that exhibits a frequency rate upon application of a rotational force to the work piece;
    exposing the at least one feature of the work piece to electromagnetic radiation from an electromagnetic radiation source;
    applying a rotational force to the work piece;
    detecting the the frequency rate associated with the at least one feature of the associated work piece; and
    rejecting the associated work piece based on the detected frequency rate.

2. The method of claim 1, wherein the electromagnetic radiation source is emitted through a central cavity of the work piece.

3. The method of claim 2, wherein the electromagnetic radiation radiates through the at least one feature of the work piece.

4. The method of claim 1, wherein the applied rotational force is substantially constant.

5. The method of claim 1, wherein the applied rotational force is predetermined.

6. The method of claim 1, wherein the step of rejecting the work piece is based upon the at least one feature of the associated work piece having a detected frequency rate outside an expected range.

7. The method of claim 1, wherein the step of rejecting the work piece is based upon the at least on feature of the associated work piece having a detected frequency rate within an expected range.

8. The method of claim 1, wherein the electromagnetic radiation source for exposing the at least one feature of the work piece is at least one light emitting diode.

9. The method of claim 1, wherein the step of detecting the frequency rate associated with the at least one feature of the work piece is a receiver capable of detecting electromagnetic radiation.

10. The method of claim 1, wherein the exposing step and the detecting step is performed with a combined electromagnetic radiation source and detector.

11. A system for detecting the efficacy of features formed in a work piece, the system comprising:
    at least one roller that engages an associated work piece and is capable of applying a rotational force to the work piece, wherein the associated work piece includes at least one feature that exhibits a frequency rate upon application of the rotational force;
    a source of electromagnetic radiation that emits electromagnetic radiation through the at least one feature of the associated work piece;
    a detector for detecting a frequency rate associated with the at least one feature of the electromagnetic radiation when the rotational force is applied; and
    a rejection criterion for rejecting associated work pieces based upon the detected frequency rate.

12. The system of claim 11, wherein the electromagnetic radiation is emitted through a central cavity of the work piece.

13. The system of claim 12, wherein the electromagnetic radiation radiates through the at least one feature of the work piece.

14. The system of claim 13, wherein the detector detects the frequency rate of the electromagnetic radiation radiated through the at least one feature of the work piece.

15. The system of claim 11, wherein the at least one roller imparts an applied rotational force on the associated work piece.

16. The system of claim 15, wherein the applied rotational force is substantially constant.

17. The system of claim 15, wherein the applied rotational force is predetermined.

18. The system of claim 11 further including a rejection criterion for rejecting associated work pieces that have the detected frequency rate outside of an expected range.

19. The system of claim 11 further including a rejection criterion for rejecting associated work pieces that have the detected frequency rate within an expected range.

20. The system of claim 11, wherein the electromagnetic radiation source is at least one light emitting diode.

21. The system of claim 11, wherein the electromagnetic radiation source is at least one laser.

22. The system of claim 11, wherein the detector is a receiver capable of detecting electromagnet radiation.

23. The system of claim 22, wherein the receiver is an optical sensor.

24. The system of claim 23, wherein the detector and receiver are integral to each other.

25. A method for detecting the efficacy of features formed in a work piece, the method comprising:
    loading an associated work piece into a test position, wherein the associated work piece includes at least one feature that exhibits a frequency rate upon application of a rotational force to the work piece;
    exposing the at least one feature of the work piece to electromagnetic radiation from an electromagnetic radiation source;
    applying a rotational force to the work piece; and
    detecting the frequency rate associated with the at least one feature of the associated work piece and
    rejecting the associated work piece based upon the detected frequency rate.

26. The method of claim 25, wherein the electromagnetic radiation radiates through the at least one feature of the work piece.

27. The method of claim 25, wherein the applied rotational force is substantially constant.

28. The method of claim 25, wherein the applied rotational force is predetermined.

29. A method for detecting the efficacy of features formed in a work piece, the method comprising:
    loading an associated work piece into a test position, wherein the associated work piece includes at least one feature that exhibits a frequency rate upon application of a rotational force to the work piece;
    exposing the at least one feature of the work piece to electromagnetic radiation from an electromagnetic radiation source;
    applying a rotational force to the work piece; and
    detecting the frequency rate associated with the at least one feature of the associated work piece and;
    rejecting the work piece if the detected frequency rate is outside an expected range.

30. A method for detecting the efficacy of features formed in a work piece, the method comprising:
    loading an associated work piece into a test position, wherein the associated work piece includes at least one feature that exhibits a frequency rate upon application of a rotational force to the work piece;
    exposing the at least one feature of the work piece to electromagnetic radiation from an electromagnetic radiation source;
    applying a rotational force to the work piece; and
    detecting the frequency rate associated with the at least one feature of the associated work piece and;
    rejecting the work piece if the detected frequency rate is within an expected range.

31. A method for detecting the efficacy of features formed in a work piece, the method comprising:
    loading an associated work piece into a test position, wherein the associated work piece includes a first and a second feature that exhibit at least measurable characteristic upon application of a rotational force to the work piece;
    exposing the first feature of the work piece to electromagnetic radiation emitted from a first electromagnetic radiation source, wherein the first electromagnetic radiation source is centrally loaded within at least a portion of the work piece;
    exposing the second feature of the work piece to electromagnetic radiation from a second electromagnetic radiation source;
    applying a rotational force to the work piece; and
    detecting the at least one measurable characteristic associated with the first feature by direct detection of the electromagnetic radiation through the first feature;
    detecting the at least one measurable characteristic associated with the second feature by reflecting the electromagnetic radiation off of the second feature of the associated work piece.

32. A method for detecting the efficacy of features formed in a work piece, the method comprising:
    loading an associated work piece into a test position, wherein the associated work piece includes a first and a second feature that exhibit measurable characteristics upon application of a rotational force to the work piece;
    exposing the first feature of the work piece to electromagnetic radiation emitted from a first electromagnetic radiation source, wherein the first electromagnetic radiation source is centrally loaded within at least a portion of the work piece;
    exposing the second feature of the work piece to electromagnetic radiation from a second electromagnetic radiation source, wherein the second electromagnetic radiation source is emitted in a substantially perpendicular relationship to the electromagnetic radiation emitted from the first electromagnetic radiation source;
    applying a rotational force to the work piece; and
    detecting the measurable characteristics associated with the at least first and second feature of the associated work piece.

* * * * *